Figure 1:
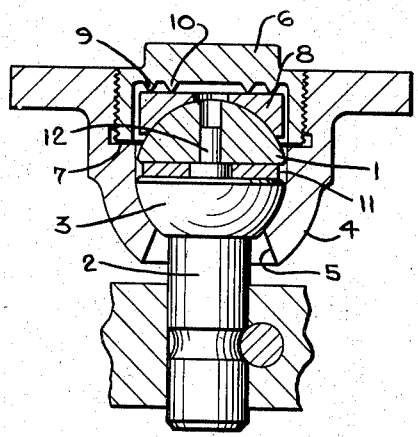

April 21, 1959  J. LATZEN  2,883,221
BALL JOINT FOR THE SUSPENSION OF AUTOMOBILE WHEELS
Original Filed June 22, 1951

INVENTOR:
JOSEF LATZEN,

've
2,883,221
BALL JOINT FOR THE SUSPENSION OF AUTOMOBILE WHEELS

Josef Latzen, Dusseldorf, Germany, assignor to A. Ehrenseich & Cie., Dusseldorf-Oberkassel, Germany, a firm Original application June 22, 1951, Serial No. 232,943. Divided and this application June 15, 1954, Serial No. 436,870

5 Claims. (Cl. 287—87)

This invention relates to ball joints for the suspension of automobile wheels; it is a division from my copending application Serial No. 232,943 filed June 22, 1951, now abandoned.

The pivot rods for the ball joints used for the suspension of automobile wheels are generally vertically disposed as the forces which the ball joints must take up are operative in a vertical direction. The advantage of vertically disposed rods consists therein that the upper half of the ball may be fully utilized to take up these forces.

In view of the great frequency of the impacts which the ball joints or their springs must take up the joints have to be free from play as otherwise excessive wear would permanently occur.

It, therefore, is an object of the invention to provide means which will provide freedom from play with ball joints of the instant type.

In compliance with this object a two-partite ball head is provided in the casing of the ball joint, said casing having a top opening and a rounded portion. This two-partite ball head has an upper pressure-exposed portion and a rod vertically downwardly extending from its lower portion; means are provided to enable a vertically slidable displacement of the upper ball head portion.

The invention will now be described in detail and with reference to the accompanying drawing showing a preferred embodiment thereof.

In the drawings

Figure 2:
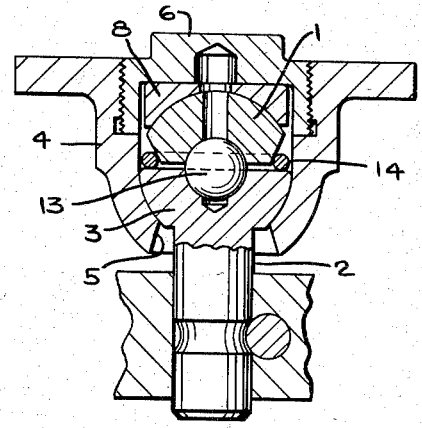
Figure 3:
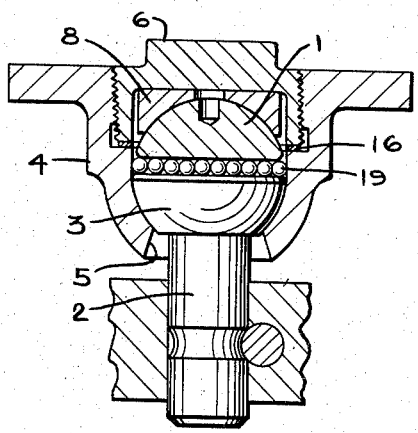

Figs. 1–3 are vertical sectional elevations of embodiments of the instant ball joint structures.

In conformity with the embodiment of the invention represented by Fig. 1 a two-partite ball head is provided which comprises an upper pressure exposed substantially hemispherical body member 1 and a lower also substantially hemispherical member 3, the latter being connected with a rod 2. The opposite ball head members 1, 3 are enclosed by a casing 4 the latter having a top opening and a rounded lower portion provided with a lower opening 5 for the passage therethrough of the rod 2. The casing 4 is connected with the stearing gear, whereas the yoke of the wheel journal engages the rod 2. In this manner the entire pressure is transmitted through the upper portion 1 of the ball.

An upper socket 8 is located in the upper half portion 1 of the ball, the socket 8 being secured in its operative position by the threaded sealing cap 6 which rests with its lower edge on an annular surface 7 of the casing 4. The inner side of the sealing cap 6 is provided with two annular projections 9, 10 liable to be deformed when the sealing cap 6 is tightened against the upper bearing surface of the socket 8, thus permitting an adjustment of the joint. The lower portion 3 of the ball head is connected with the rod 2 and the upper portion thereof is made independent. Between the two portions 1, 3 an intermediate disc 11 is provided which is retained in its position by the pivot 12. This intermediate disc may be made of a material similar to a brake lining to produce a braking action between the two separate members of the ball head 1 and 3.

In conformity with Fig. 2 a small steel ball 13 is disposed between the lower member 3 and the upper member 1 of the ball head, this steel ball being inserted into corresponding opposite cavities of the ball head members 1, 3. A ring 14 made of wire and inserted into a circumferential recess of the upper ball head member 1 prevents an undesired movement of the latter. Upon tightening the sealing cap 6 the ball 13 is forced into the lower ball head member 3, which enables an accurate adjustment of the joint.

The modification of the invention shown in Fig. 3 permits to obtain a particularly satisfactory rotation of the rod 2 about its longitudinal axis. With this purpose in view a layer of steel balls 19 is provided between the upper member 1 and the lower member 3 of the ball head. The play of the ball joint is controlled by a circular distance member 16.

Since certain changes may be made in the above article and different embodiments of the invention could be made without departing from the scope thereof, it is intended that all matter contained in the above description or shown in the accompanying drawings shall be interpreted as illustrative and not in a limiting sense.

Having thus described the invention, what I claim as new and desire to be secured by Letters Patent, is as follows:

1. A ball joint for the suspension of automobile wheels comprising a circular casing open at the top and having a rounded bottom portion with an opening therethrough, a ball head in said casing composed of separate substantially hemi-spherical upper and lower members, a rod connected to said lower member and extending downwardly through an opening of said casing, an upper cap adjustably positioned to seal said casing and being provided at its lower side with annular deformable portions, a socket having an inner hemi-spherical cavity encasing the upper ball head member and located between the latter and said upper sealing cap.

2. A ball joint comprising a casing defining on its interior a spherical surface, a spherical body disposed on the interior of said casing slidable on said surface for rotation about the spherical center and including two substantially hemispherical segments rotatable relative to each other about the axis of a predetermined large spherical diameter, one of said segments mounting a pin disposed axially of said axis, said casing having two opposite openings, one passing said pin, a cover closing the opposite opening and having a curved surface in contact with said body and being adjustably positioned in said opposite opening to vary the pressure exerted by the curved surface onto the body, and spacing means between said segments near said large diameter in direct abutment with each segment, said segments and spacing means being so arranged that upon pressure exerted axially of said large diameter towards the spherical center by said cover said segments will be moved closer towards each other.

3. A ball joint, as claimed in claim 2, each segment having an internal substantially hemispherical central cavity, said spacing means including a steel ball disposed in said cavities.

4. In a ball joint, as claimed in claim 2, each segment having a central substantially hemispherical central cavity, said spacing means including a steel ball disposed in the cavities of said segments, one of said segments having a reduced portion adjacent said large diameter defining with the other segment an annular external circumferential recess, and a wire ring disposed in said recess.

5. In a ball joint, as claimed in claim 2, said spacing means including a layer of steel balls intermediate said two segments.

References Cited in the file of this patent

UNITED STATES PATENTS

| 1,889,297 | Russell | Nov. 29, 1932 |
| 2,108,814 | Flumerfelt | Feb. 22, 1938 |
| 2,614,873 | Booth | Oct. 21, 1952 |

FOREIGN PATENTS

| 231,715 | Great Britain | of 1925 |
| 1,049,045 | France | Aug. 12, 1953 |